Patented Nov. 2, 1926.

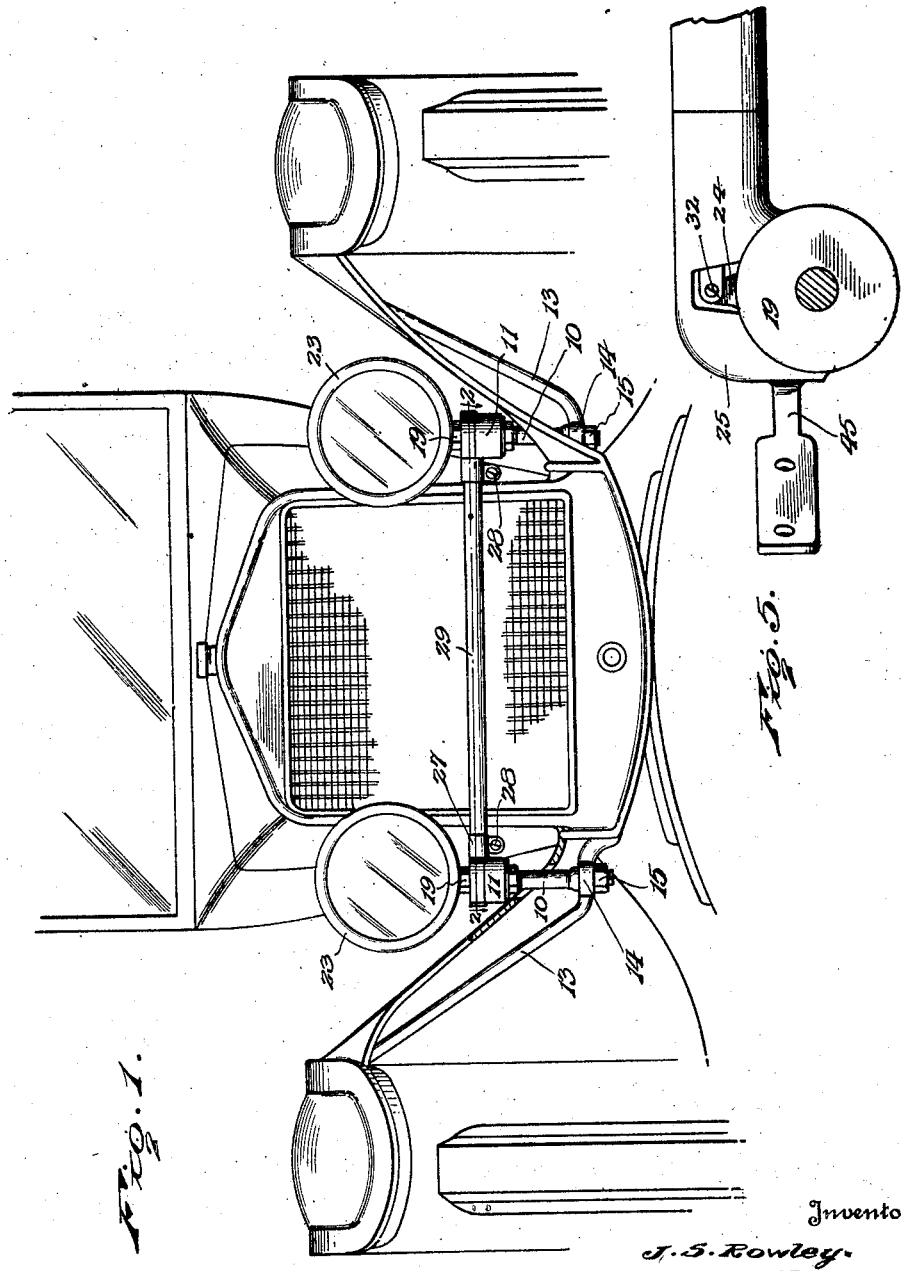

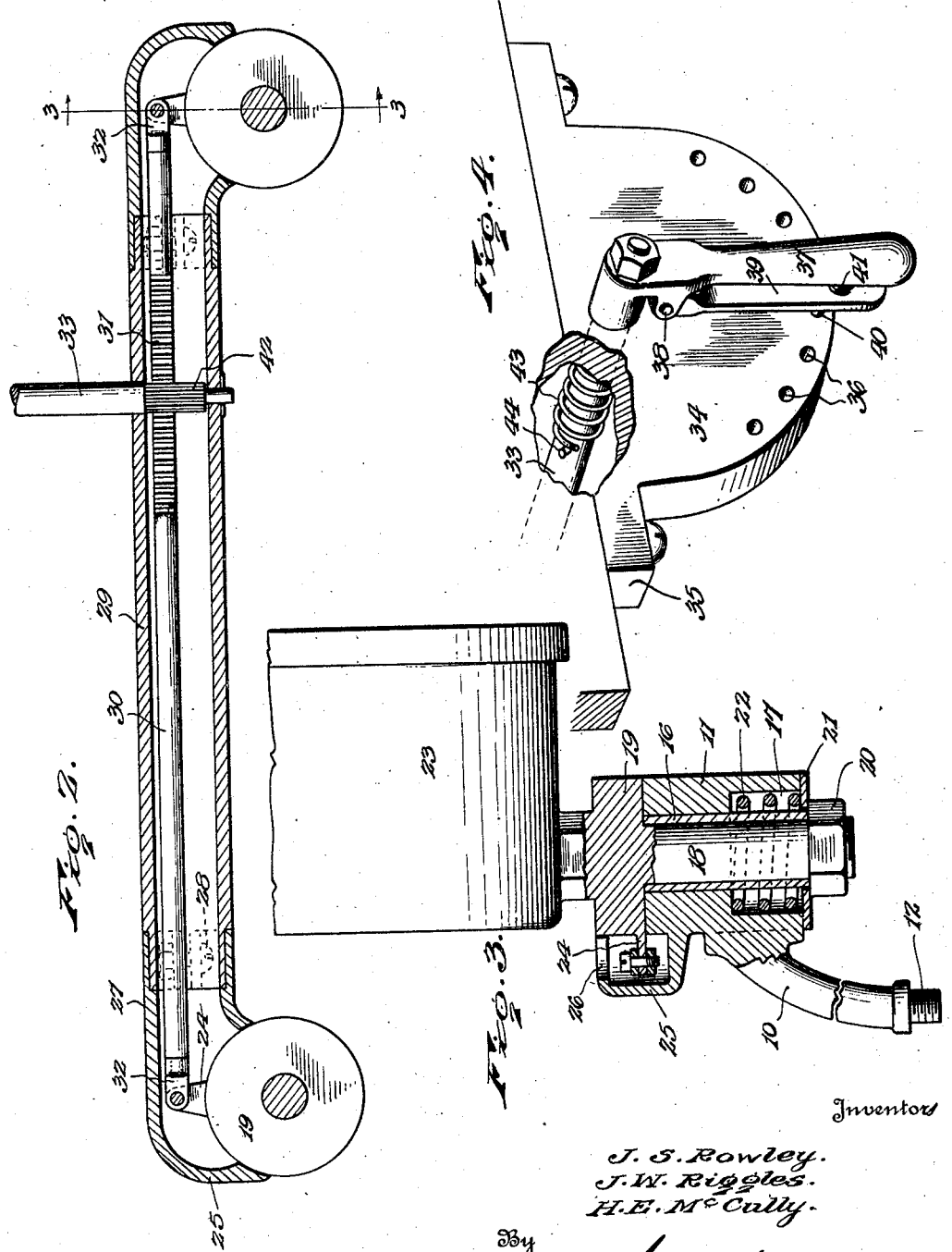

1,605,072

UNITED STATES PATENT OFFICE.

JOHN S. ROWLEY, JOHN W. RIGGLES, AND HILAND E. McCULLY, OF LANSING, MICHIGAN.

DIRIGIBLE-HEADLIGHT MECHANISM.

Application filed October 30, 1924. Serial No. 746,847.

This invention relates to an improved dirigible headlight mechanism for motor vehicles and seeks, among other objects, to provide a means whereby the headlights of a vehicle may be easily and conveniently turned manually for lighting the roadway when the vehicle is turning a curve or corner, turning around in a street or alley, or entering a garage or the like.

The invention seeks, as a further object, to provide a manually operated latch for locking the headlights in position directed straight ahead or in position when turned in either one direction or the other.

And the invention seeks, as a still further object, to provide a mechanism which will be sturdy in its construction and which may be readily applied to motor vehicles as now in use.

Other and incidental objects will appear hereinafter.

In the accompanying drawings:

Figure 1 is a front elevation showing our improved headlight mechanism in connection with a conventional motor vehicle.

Figure 2 is a horizontal sectional view on the line 2—2 of Figure 1, looking in the direction indicated by the arrows.

Figure 3 is a vertical sectional view on the line 3—3 of Figure 2, looking in the direction indicated by the arrows.

Figure 4 is a detail perspective view showing the hand lever and latch employed.

Figure 5 is a fragmentary plan view showing a slight modification of the invention.

In carrying the invention into effect, we employ a pair of brackets 10 which are curved forwardly toward their upper ends and are formed with vertical bearings 11 while at their lower ends, the brackets are provided with studs 12. In Figure 1 of the drawings, we have shown the mechanism in connection with a conventional motor vehicle end, as will be observed, the brackets 10, in the instance illustrated, are mounted upon the front fender brackets 13 of the vehicle. In accordance with conventional practice, the brackets 13 are provided near their lower ends with eyes 14 and the studs 12 of the brackets 10 are inserted through these eyes and secured by nuts 15. The brackets 10 are thus rigidly mounted and, as will be appreciated, may be readily applied.

As shown in Figure 3, the bearings 11 are hollow and are provided with axial bearing sleeves 16 while at their lower ends the bearings are formed with recesses 17. Journaled through said sleeves are spindles 18 on which are formed annular flanges 19 to rest against the upper ends of the bearings, and screwed on the lower ends of said spindles are nuts 20 securing the spindles in position. Supported by said nuts to overlie the lower ends of the bearings are washers 21 and surrounding the bearing sleeves 16 to act against said washers are springs 22 pressing the spindles downward. Integral with or otherwise appropriately fixed upon the upper ends of the spindles are headlights 23 and, as will be appreciated, the springs 22 will tend to prevent vertical vibration of the headlights.

Projecting from the flanges 19 of the spindles 18, at the rear sides of said flanges, are radial lugs 24 and integrally formed on the upper ends of the bearings 11 at their rear sides are housings 25 enclosing said lugs. As brought out in Figure 3, the upper side walls of the housings are provided with slots 26 adapted to freely receive the lugs 24 therethrough so that the spindles 18 may be assembled upon the bearings 11 while, as brought out in Figure 2, said housings terminate in alined nipples 27 which project toward each other between the bearings. These nipples are split at their lower sides and are provided with downturned lugs accommodating clamping bolts 28. Fitting at its ends in the nipples is a cross tube 29 which is rigidly clamped in said nipples by the bolts 28 so that the cross tube will thus serve to rigidly brace the bearings 11 with respect to each other, and extending freely through said tube is a rod 30 on which is formed a rack 31. Screwed upon the ends of the rod are yokes 32 which are pivotally connected to the lugs 24 of the spindles 18 so that the rod thus couples the spindles to turn in unison. As brought out in Figure 3, the top walls of the housings 25 preferably lie flush with the upper faces of the flanges 19 of the spindles and are formed with curved edges to fit said flanges so that moisture cannot readily enter the housings.

Accordingly, the housings, in conjunction with the cross tube 29, will serve to protect the connecting rod 30, and associated parts as well as prevent the collection of mud thereon.

Journaled through the cross tube 29 above the rod 30 is a control shaft 33 which extends rearwardly through the engine hood of the vehicle, and mounted upon the lower edge of the vehicle instrument board is, as shown in Figure 4, a block 34 journaling the rear end of the shaft. The block is provided with lugs 35 through which are engaged screws or other suitable fastening devices securing the block to the instrument board, and formed in the block in concentric relation to the shaft is a series of spaced sockets 36. Detachably fixed to the adjacent end of the shaft is a hand lever 37 provided at its inner side with ears 38 and pivoted between said ears is a latch 39 carrying a stud 40 selectively engageable in the sockets 36 of the block. Bearing between the handle and the free end of the latch is a spring 41. Formed on the forward end of the shaft 33 or otherwise fixed thereto, is a pinion 42 meshing with the rack 31 of the rod 30 and surrounding the rear end portion of the rod is, as shown in Figure 4, a spring 43 bearing at one end against the block 34 and at its opposite end against a pin 44 for holding the shaft against endwise vibration.

As will now be seen in view of the foregoing description, when the handle 37 is disposed in vertical position, as shown in Figure 4, the spring 41 of the latch 39 will act against the latch for holding the stud 40 thereof seated in one of the sockets 36 of the block 34 so that the shaft 33 will be held against rotation and the headlights 23 consequently locked in position straight ahead. However, by grasping the handle 37 and swinging the latch to free the stud 40, the handle may be swung in either one direction or the other for turning the control shaft 33 and accordingly, through the medium of the pinion 42 and rack 31, rotating the spindles 18 to turn the headlights. Thus, in turning a curve, a corner, or the like, the headlights may be conveniently rotated in the desired direction for illuminating the roadway and, as will be appreciated, the stud 40 of the latch 39 may be selectively engaged in the sockets 36 of the block 34 for locking the headlights in set position when turned.

In Figure 5 of the drawings, we have shown a slight modification of the invention wherein the bearings 11 are provided, in lieu of the brackets 10, with side brackets 45 disposed for attachment to the front fender aprons of a vehicle for supporting the bearings thereon. On certain makes of vehicles the brackets 10 would not be suitable and in such event, the brackets 45 are employed. Otherwise, this modified structure is identical with the preferred construction and further description is accordingly believed unnecessary.

Having thus described the invention, what we claim is:

1. A dirigible headlight mechanism including companion brackets having bearings provided with housings, a cross tube extending between the housings bracing the bearings with respect to each other, spindles journaled by said bearings and provided with flanges seating against the upper ends of the bearings, headlights carried by said spindles, said flanges being formed with lugs projecting into said housings, a rod extending through said cross tube and connected with said lugs coupling the spindles to turn in unison, and a control shaft journaled upon said cross tube and having driving connection with said rod for shifting the rod and rotating the spindles.

2. A dirigible headlight mechanism including companion bearings counterbored at their lower ends to form recesses and provided with bearing sleeves projecting into said recesses, spindles journaled through said sleeves, springs housed in said recesses to surround said sleeves and coacting between the bearings and said spindles for yieldably holding the spindles against vertical movement, headlights carried by the spindles, and means for rotating the spindles in unison and turning the headlights.

3. A dirigible headlight mechanism including companion bearings counterbored at their lower ends to form recesses and provided with bearing sleeves projecting into said recesses, spindles journaled through said sleeves, washers carried by the spindles and closing said recesses, springs housed in said recesses and coacting between the bearings and said washers, for yieldably holding the spindles against vertical movement, headlights carried by the spindles, and means for rotating the spindles in unison and turning the headlights.

In testimony whereof we affix our signatures.

JOHN S. ROWLEY. [L. S.]
JOHN W. RIGGLES. [L. S.]
HILAND E. McCULLY. [L. S.]